July 8, 1941.  E. F. PIERCE  2,248,780
MANIFOLD PRESSURE REGULATOR
Filed Nov. 25, 1939
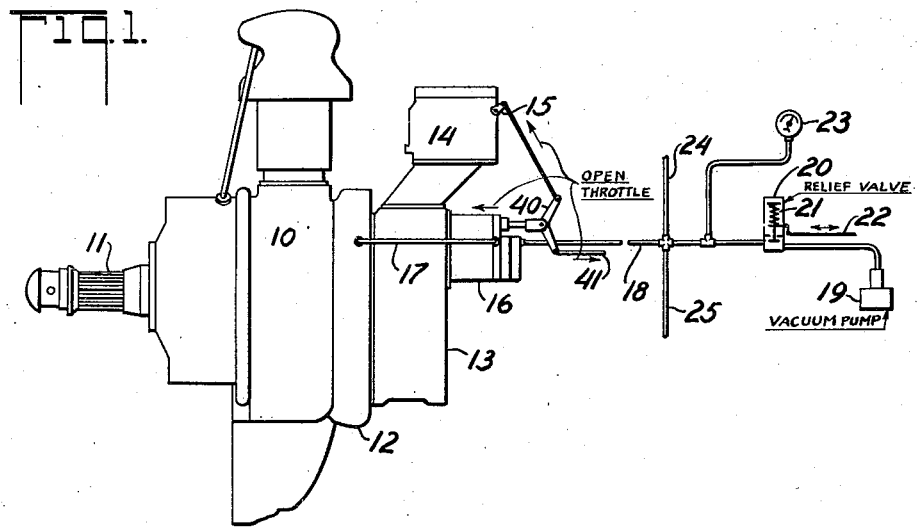
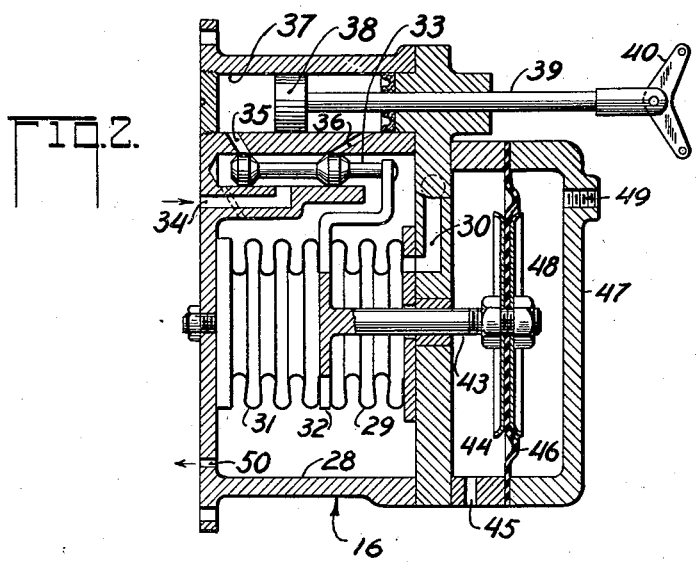
INVENTOR
EROLD F. PIERCE
BY
ATTORNEY Patented July 8, 1941

2,248,780

UNITED STATES PATENT OFFICE 2,248,780

MANIFOLD PRESSURE REGULATOR

Erold F. Pierce, Pines Lake, N. J., assignor to Wright Aeronautical Corporation, a corporation of New York Application November 25, 1939, Serial No. 306,145

2 Claims. (Cl. 123—75)

This invention relates to control devices for internal combustion engines and is particularly concerned with improvements in manifold pressure control systems, the invention being particularly adapted for use with multiple power plants.

In aircraft having a plurality of engines, each equipped with a controllable pitch propeller, the manifold pressure, in other words the pressure existing between the engine throttle and the cylinders, is a convenient means for determining the horsepower output and, when it is desired to run one or more engines at constant power, provision may be made to hold manifold pressure at a constant value. Prior art devices have been suggested for maintaining constant manifold pressure in single engines, such devices comprising a throttle actuating motor controlled by a valve responsive in its movement to changes in manifold pressure with respect to an adjustable datum such as a spring. When such devices are used on a number of engines it is obvious that in order to change the manifold pressure setting, relatively complicated mechanical remote controls must be brought from each manifold pressure regulator to a central control point, but this does not provide particularly satisfactory unitary control since each regulator is equipped with an independent spring and, between several regulators, the characteristics of the springs may vary.

Accordingly, it is an object of this invention to provide a unitary control system for a plurality of manifold pressure regulators whose action will be uniform for all regulators and whose control will be simple and free of mechanical complexity.

A further object of the invention is to provide a unitary pneumatic or vacuum control system for a plurality of manifold pressure regulators. It is obvious that the system may be applied to a single manifold pressure regulator as well as to a plurality.

Further objects of the invention will become apparent in reading the annexed detailed description and claims in connection with the drawing, in which:

Fig. 1 is a side elevation of an aircraft engine including the control system; and Fig. 2 is an enlarged sectional view of a manifold pressure regulator embodying the features of the invention.

In Fig. 1 an engine 10 carries a protruding power shaft 11 on which is adapted to be mounted a conventional propeller. Rearward of the main crankcase of the engine a supercharger section 12 is shown, rearward of which is an accessory section 13 on which is mounted a carburetor 14 having a throttle lever 15 and from which the fuel mixture is fed to the supercharger. On the accessory section 13 a manifold pressure regulator 16 is secured to which is connected a conduit 17 leading from the high pressure side of the supercharger so that true manifold pressure exists in the conduit.

Also, to the regulator 16 is secured a vacuum conduit 18 which leads to a vacuum pump 19, the conduit having interposed therein an adjustable vacuum relief valve 20 whose spring 21 may be adjusted by a manual control member 22. Presuming that the pump can at all times maintain a higher vacuum than is necessary, the valve 20 allows for the adjustment of the effective vacuum in the line 18 to any desired value which may be read upon a gage 23. The conduit 18 has branch passages 24 and 25 which lead to other regulators 16 on additional power plants, not shown.

Referring now to Fig. 2, the regulator 16 comprises a housing 28 containing a closed bellows 29 in communication with the conduit 17 through a passage 30. An opposing bellows 31 may contain a fixed quantity of gas or air, or may be partially evacuated, so that changes in position of a member 32 between the bellows is responsive to gauge pressure (as distinct from absolute pressure) changes of manifold pressures. This member 32 serves as an operator for a valve stem 33 which serves to admit pressure oil from the engine lubricating system, through passages 34 and 35 or 36 to the left or right hand of cylinder 37 in which a piston 38 is slidable.

Hydraulic fluid which is valved from the cylinder 37 through the valve passages 35 or 36 into the housing 28 returns to the engine system through a drain opening 50.

A piston rod 39 carries a swingable bell crank 40 centrally pivoted thereto, one end of the bell crank being linked to the throttle lever 15 and the other end being linked to a manual throttle control rod 41, shown in Fig. 1.

Now, the member 32 carries a rod 43 which passes through the wall of the housing 28 into a chamber 44, vented to the atmosphere at 45 and covered by membrane or diaphragm 46 whose opposite side is covered by a member 47 which defines with the diaphragm 46 a cell 48. This cell is connected at 49 with the vacuum conduit 18.

In operation, a preset vacuum is maintained within the cell 48 which tends to move the rod 43 toward the right. Positive manifold pressure within the bellows 29 tends to move the rod 43 to the left. If a pressure balance is obtained between the bellows 29 and the cell 48, the member 32 will cause the valve 33 to shut off the hydraulic motor, but if manifold pressure increases or decreases, the member 43 will move either to the left or to the right respectively to cause actuation of the hydraulic motor and closing or opening respectively of the throttle 15, presuming that the member 41 is fixed. If the member 41 be moved, manifold pressure will change and the system will stabilize in such a position as that established by the existing value of vacuum in the cell 43.

Where several power plants are used, there will be a regulator on each and a cell 48 on each, and all of these cells will have precisely the same value of vacuum through intercommunication established by the conduits 18, 24 and 25. Accordingly, the manifold pressure of all engines is maintained constant and equal as the result of the single vacuum pump 19, and changes in manifold pressure may be made equally in all power plants by manipulation of the single relief valve control 22.

In effect, the vacuum system is equivalent to a pneumatic spring and it differs functionally from a metallic spring in that the force exerted thereby is constant regardless of the displacement position of any diaphragm 46. Thus, control of a plurality of power plants may be easily effected and the joint and equal control thereof is not only independent of the individual characteristics of the engine but also allows of equalization of manifold pressure of several engines more promptly and without hunting than would be possible if spring type regulators were used with a coincidental control for the several springs. The control shown might easily be operated pneumatically or hydraulically with controlled positive pressure which might be applied either in the chamber 44 or in the bellows 31, to directly oppose manifold pressure existing in the bellows 29.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In a manifold pressure control device for internal combustion engines comprising a piston-cylinder motor for operating the engine throttle and a valve controlling admission of pressure fluid to the motor; means for operating said valve comprising a member having secured thereto one end of a bellows, the other end of the bellows being rigidly supported and the bellows' interior communicating with the engine manifold, an elastic diaphragm mounted in a housing, the diaphragm being connected with said valve member, the diaphragm and housing defining a chamber, and adjustable pneumatic means communicating with said chamber and acting upon said diaphragm.

2. In a manifold pressure control device for internal combustion engines comprising a piston-cylinder motor for operating the engine throttle and a valve controlling admission of pressure fluid to the motor; means for operating said valve comprising a member having secured thereto one end of a bellows, the other end of the bellows being rigidly supported and the bellows' interior communicating with the engine manifold, an elastic diaphragm mounted in a housing the diaphragm being connected with said valve member, the diaphragm and housing defining a chamber, and adjustable pneumatic means communicating with said chamber and acting upon said diaphragm, said diaphragm, when subject to increased pressure on one side thereof tending to move said member for throttle opening and in the opposite direction from movement urged by increase in manifold pressure.

EROLD F. PIERCE.